(12) United States Patent
Kaeb et al.

(10) Patent No.: US 8,770,387 B2
(45) Date of Patent: Jul. 8, 2014

(54) VERTICAL LIFT CONVEYOR

(75) Inventors: Todd Kaeb, Cissna Park, IL (US); Tom Fehr, Paxton, IL (US); Geoffrey Jason Furrer, Wolcott, IN (US)

(73) Assignee: KSi Conveyor, Inc., Sabetha, KS (US)

( * ) Notice: Subject to any disclaimer, the term of this patent is extended or adjusted under 35 U.S.C. 154(b) by 234 days.

(21) Appl. No.: 13/178,632

(22) Filed: Jul. 8, 2011

(65) Prior Publication Data
US 2013/0008764 A1 Jan. 10, 2013

(51) Int. Cl.
*B65G 15/14* (2006.01)
*B65G 15/18* (2006.01)

(52) U.S. Cl.
CPC ...................................... *B65G 15/18* (2013.01)
USPC ...................................... 198/626.4; 198/626.6

(58) Field of Classification Search
USPC .......... 198/626.1, 626.2, 626.3, 626.4, 626.5, 198/626.6, 632, 313
See application file for complete search history.

(56) References Cited

U.S. PATENT DOCUMENTS

| | | | |
|---|---|---|---|
| 2,568,865 A * | 9/1951 | Neighbour et al. ........... | 198/320 |
| 3,144,929 A * | 8/1964 | Hall ............................. | 198/626.3 |
| 3,228,516 A * | 1/1966 | Sheehau ....................... | 198/303 |
| 3,718,819 A * | 2/1973 | Miksitz ....................... | 250/358.1 |
| 3,734,270 A | 5/1973 | Foody | |
| 3,910,405 A | 10/1975 | Couperus et al. | |
| 3,982,626 A | 9/1976 | Mehta | |
| 4,195,724 A | 4/1980 | Janitsch | |
| 4,382,502 A * | 5/1983 | Beresinsky ................. | 198/626.4 |
| 4,425,995 A | 1/1984 | Blattermann et al. | |
| 4,585,118 A | 4/1986 | Plaut | |
| 4,732,264 A | 3/1988 | Engst | |
| 4,776,450 A | 10/1988 | Schwing et al. | |
| 4,936,441 A | 6/1990 | Akesaka | |
| 5,360,097 A * | 11/1994 | Hibbs .......................... | 198/313 |
| 5,662,210 A * | 9/1997 | Toews ......................... | 198/632 |
| 5,875,697 A * | 3/1999 | Cole et al. .................... | 83/435.2 |
| 6,484,870 B2 | 11/2002 | Bohnker et al. | |
| 2004/0031662 A1* | 2/2004 | Dekoning ...................... | 198/313 |
| 2007/0029170 A1* | 2/2007 | Anagnost ...................... | 198/588 |

* cited by examiner

*Primary Examiner* — James R Bidwell
(74) *Attorney, Agent, or Firm* — Daniel J. Coughlin

(57) ABSTRACT

A vertical lift conveyor for lifting bulk, or particulate, material includes a lower, generally horizontal intake stage for receiving the bulk material on a first endless carrier belt and a second endless support belt positioned in closely-spaced relation to the first belt. The two belts are displaced at essentially the same speed, with their respective adjacent edge portions maintained in intimate contact with one another by means of low friction guides and belt tension to confine the bulk material between the two belts during transport. Plural spaced belt engaging arrangements are disposed along the vertical run of the conveyor to provide support for the bulk material and maintain the edge seal between the two moving belts. The vertical lift conveyor further includes an intake stage adapted to receive the bulk material and movable between an extended, use position and a retracted storage, or transport, position.

19 Claims, 9 Drawing Sheets

US 8,770,387 B2

VERTICAL LIFT CONVEYOR

FIELD OF THE INVENTION

This invention relates generally to the transport of bulk, or particulate, material via a conveyor arrangement and is more particularly directed to a vertical lift conveyor for moving bulk material to a higher elevation by means of two moving, generally flat belts in mutual engagement.

BACKGROUND OF THE INVENTION

Conveyors for transporting materials may take on various forms depending upon the function being performed. Some conveyors operate to transport material horizontally, while others are oriented at an inclined angle to elevate the materials. Still other conveyors include a generally vertical span for lifting or lowering material between lower and upper elevations. Vertically oriented conveyors may include plural-spaced retaining members, such as buckets, for holding the material during vertical transport and a discharge arrangement for discharging the content of the buckets upon arrival at either the upper or lower elevation. Other vertical conveyors use plural rollers, or idlers, with dual endless belt conveyor systems. The rollers typically engage opposed edges of the first and second conveyor belts and may be either aligned along the direction of travel of the belts or arranged in a staggered array. The rollers may even be arranged at an inclined angle relative to the direction of travel of the conveyor belts to provide desired operating characteristics such as directing the bulk material toward the centerlines of the two moving belts. Examples of these types of conveyors can be found in U.S. Pat. Nos. 3,982,626; 4,195,724 and 4,585,118.

Various attempts have been made to improve belt tracking for dual endless conveyor belts such as in the use of interlocking belts which are complex in design and expensive to manufacture. An example of this type of conveyor can be found in U.S. Pat. No. 4,425,995. Even the use of spaced rollers engaging adjacent edge portions of the two transport belts has suffered from limitations in terms of bulk material becoming lodged between the edges in the space between adjacent rollers. If the bulk material trapped between abutting belt edges is allowed to accumulate between the adjacent edges, the sealing relationship between the belts may be lost and the bulk material may escape, particularly during a vertical portion of material transport. In addition, inadequate support for the transported material particularly during vertical transport can lead to separation of the belts and leakage of the material.

The present invention addresses the aforementioned limitations of the prior art by proving a tight seal between adjacent edges of a pair of bulk material transporting belts in the horizontal to vertical transition stage, as well as in the vertical transport of the bulk material. In the transition stage, either segmented belt edge guides or a pair of closely spaced, continuous tracks are used to maintain adjacent edges of the two moving endless belts in intimate contact. In the vertical stage of transport, plural spaced belt engaging mechanisms urge the two belts toward one another and support the transported material. The inventive vertical lift conveyor further includes an extendable intake stage which facilitates deposit of the bulk material onto the conveying belt, while reducing the "foot print" of the lift conveyor when not in use, or during transport.

OBJECTS AND SUMMARY OF THE INVENTION

Accordingly, it is an object of the present invention to provide a vertical conveyor for bulk materials which employs a pair of moving generally flat, endless belts without the need for rollers forming a seal between adjacent edges of the belts.

It is another object of the present invention to provide a bulk material lift conveyor which requires minimum floor space, is easily movable between adjacent storage bins, and facilitates the deposit of bulk, or granular, material in its intake stage.

Yet another object of the present invention is to provide a vertical elevator for bulk material, such as feed, grain or other commodities, which receives, transports and discharges the material using a pair of flexible, edge-engaging endless belts and which protects the material from impact damage and high pressure damage while securely confining the material from deposit to discharge.

A further object of the present invention is to provide a tight seal between adjacent edges of a carrier belt and a support belt in a bulk material vertical lift conveyor, as well as lateral support for the bulk material confined between the two belts during vertical transport.

A still further object of the present invention is to provide a tight seal between adjacent edges of a carrier belt and a support belt between which is confined a bulk material in the horizontal to vertical transition stage of a vertical lift conveyor using either segmented belt edge guides or a pair of continuous, space edged guides.

The present invention contemplates a vertical lift conveyor wherein bulk material disposed between and engaged by first and second flexible, endless belts is transported from a lower elevation to a higher elevation, the apparatus comprising: first and second spaced belt guides engaging and maintaining adjacent opposed edges of the first and second belts in sealed contact for confining the bulk material between the first and second belts during vertical transport of the bulk material; first and second support members respectively engaging outer portions of the first and second belts during vertical transport of the bulk material; and first and second biasing means engaging the first and second support members for urging the first and second support members inwardly into contact with the first and second belts and providing lateral support for the bulk material disposed between and engaged by the belts during vertical transport.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
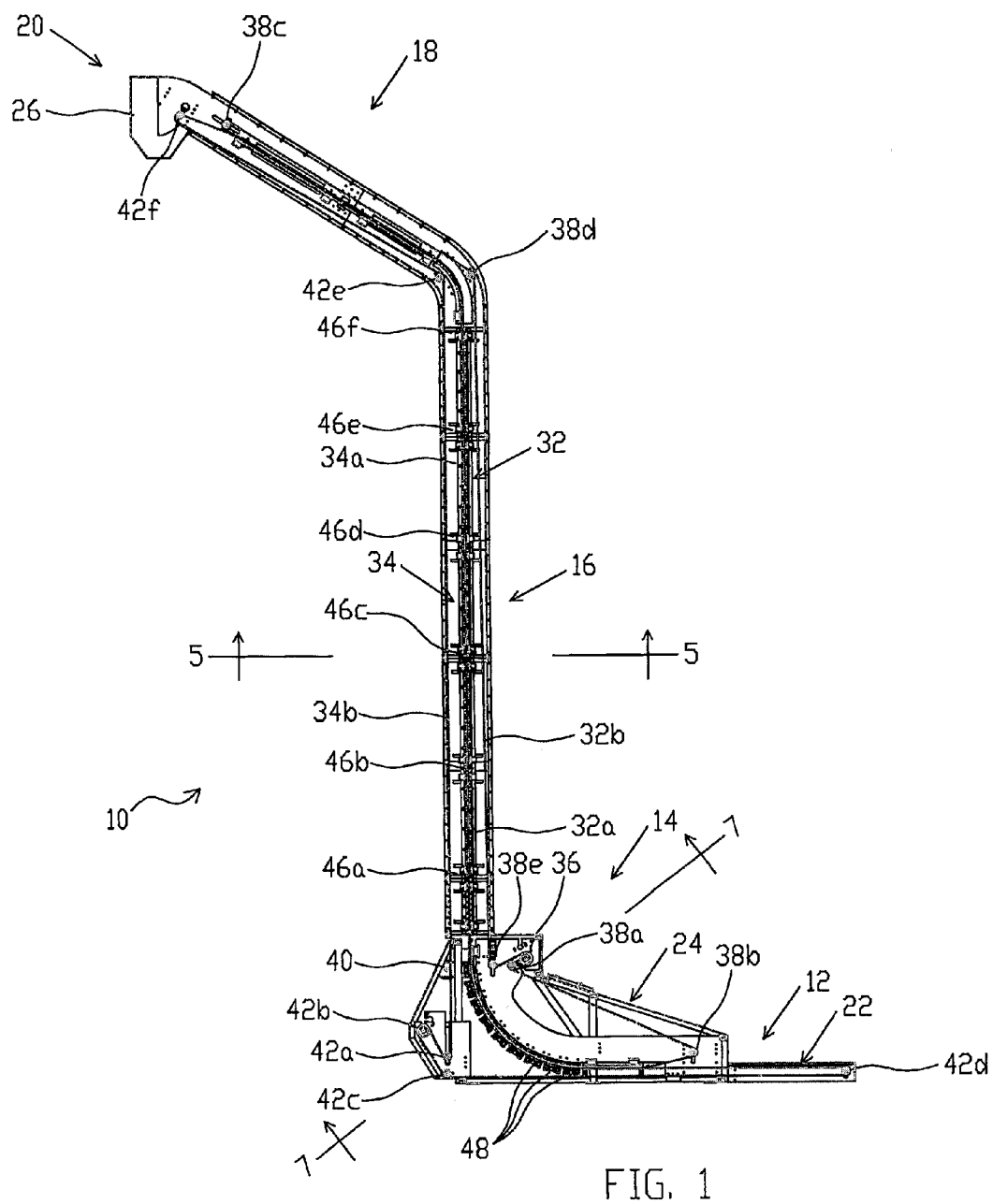
FIG. 1 is a lateral vertical sectional view of a vertical lift conveyor in accordance with the principles of the present invention.
Figure 3:
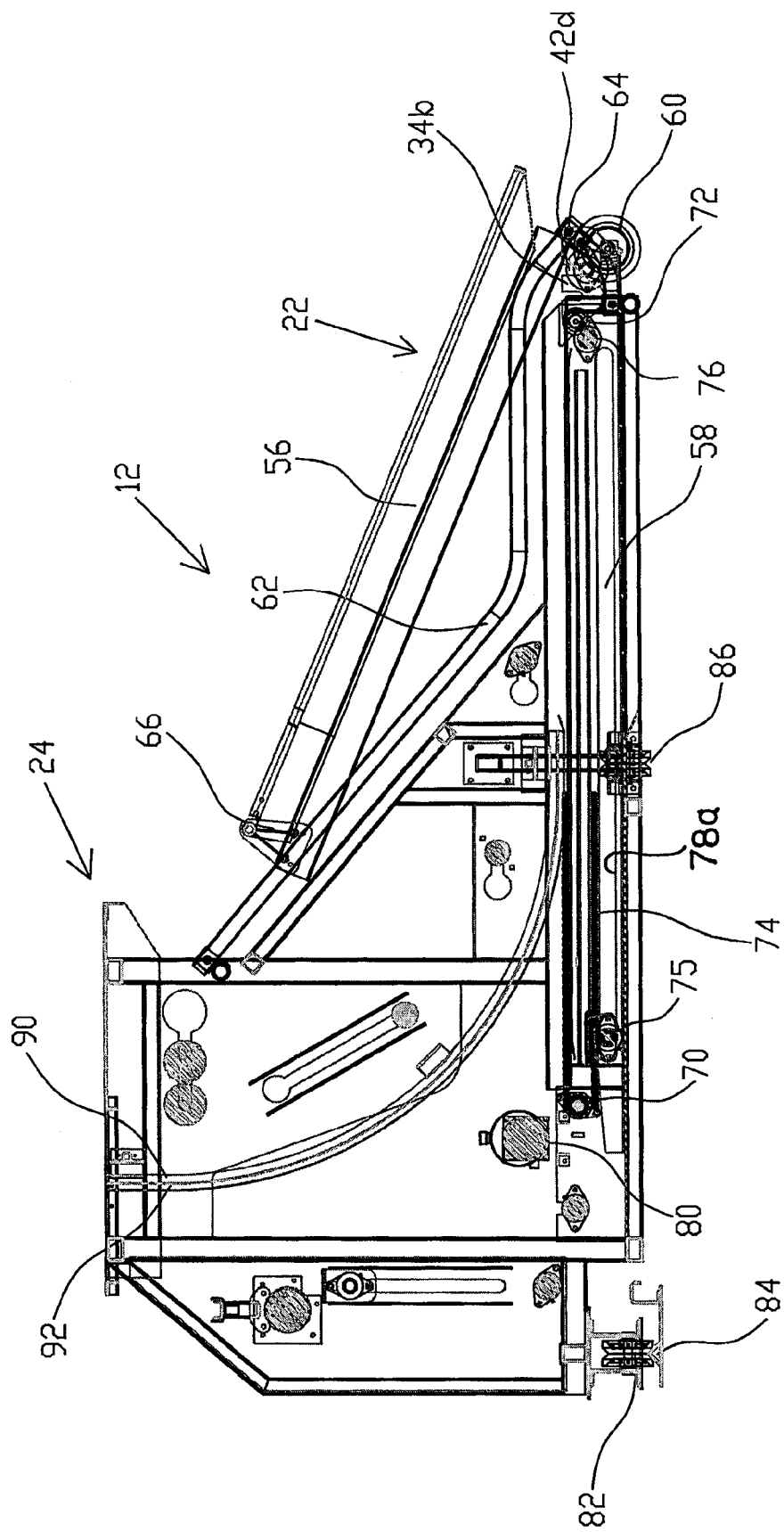
FIG. 3 is a lateral sectional view of the lower portion of the inventive vertical lift conveyor similar to that shown in FIG. 2, with the intake extension shown in the retracted, or nonuse, position.

Referring to FIG. 1, there is shown a vertical sectional view of one embodiment of a vertical lift conveyor 10 in accordance with the principles of the present invention. Vertical lift conveyor 10 includes a conveyor intake stage 12 having an intake extension 22 adapted to receive bulk material deposited thereon. The bulk material may take on various forms such as feed, grain or virtually any other type of commodity, or may be in various other forms such as rocks, sand or plastic pellets. Intake extension 22 is movable between an extended, use position as shown in FIG. 1, and a retracted position as shown in FIG. 3 and as described in detail below. Vertical lift conveyor 10 further includes a drive/transition stage 14 coupled to the conveyor intake stage 12 and adapted for transporting the bulk material deposited in the intake extension 22 from a horizontal path of travel to a generally vertical path of travel. Disposed above and coupled to the drive/transition stage 14 is the vertical lift conveyor's trunk stage 16 wherein the bulk material is transported vertically from a lower position to a higher position. Disposed on and extending from the upper end of the conveyor trunk stage 16 is an inclined, upper stage 18 at the distal end of which is located a conveyor discharge stage 20. The inclined, upper stage 18 of vertical lift conveyor 10 transitions the transported bulk material from a generally vertical path in the conveyor trunk stage 16 to an inclined, upward path which is laterally spaced from the conveyor trunk stage. Conveyor discharge stage 20 deposits the transported bulk material to either another material handling apparatus, to a storage area or container for the bulk material, or to the location where the bulk material is to be used.

Vertical lift conveyor 10 includes a first flat, flexible belt 32 and a second flat, flexible belt 34, each of which is of the endless belt type, and which may include a splice. The first and second generally flat, flexible belts 32, 34 are displaced within the vertical lift conveyor 10 over upward and downward transport paths. Thus, first belt 32 includes an inner, upwardly directed, transport stage 32a and an outer return stage 32b. Similarly, second belt 34 includes an inner upwardly directed, transport stage 34a and an outer return stage 34b. The upwardly directed, transport stages 32a and 34a of the first and second belts 32, 34, respectively, are directed in closely spaced relation through plural segmented belt edge guides 48 which engage and maintain adjacent edges of the two belts in intimate contact as described below as the belts transit the conveyor's drive/transition stage 14. Continued intimate edge engagement between the first and second upwardly directed, belt transport stages 32a and 34a is maintained within the conveyor trunk stage 16 by means of first through sixth belt engaging mechanisms 46a-46f which are described in detail below. The first through sixth belt engaging mechanisms 46a-46f are arranged in a spaced manner along the length of the conveyor trunk stage 16 and engage the outer surfaces of the first and second upwardly directed, transport stages 32a, 34a of the transport belts so as to support the bulk material within and between the two transport belts. The bulk material is transported to and through the conveyor inclined, upper stage 18, where the first and second belts 32 and 34 are separated, allowing the bulk material to be discharged from the conveyor discharge hood 26 in the discharge stage 20.

Plural rollers are provided for defining the course of the return stages 32b and 34b of the first and second belts 32, 34. Thus, in the conveyor inclined upper stage 18, rollers 38c and 38d engage the first belt's return stage 32b and direct it vertically down through the conveyor trunk stage 16. In the lower portion of the vertical lift conveyor 10 such as in its intake stage 12 and drive/transition stage 14, rollers 38a, 38b and 38c engage and guide the first belt's return stage 32b. Roller 36, which preferably is coupled to a drive mechanism (not shown) for displacing the first belt 32, also engages the first belt in the drive/transition stage 14 of the conveyor. Following transit of roller 38b, the first flat, flexible belt 32 is directed into an array of segmented belt edge guides 48.

Similarly, the return stage 34b of the second belt 34 in the conveyor inclined, upper stage 18 is directed by rollers 42f and 42e to lower rollers 40, 42b, 42c and 42d. In the embodiment shown in FIG. 1, roller 40 is coupled to a second drive motor (also not shown) which displaces the second flat, flexible belt 34.

Figure 2:
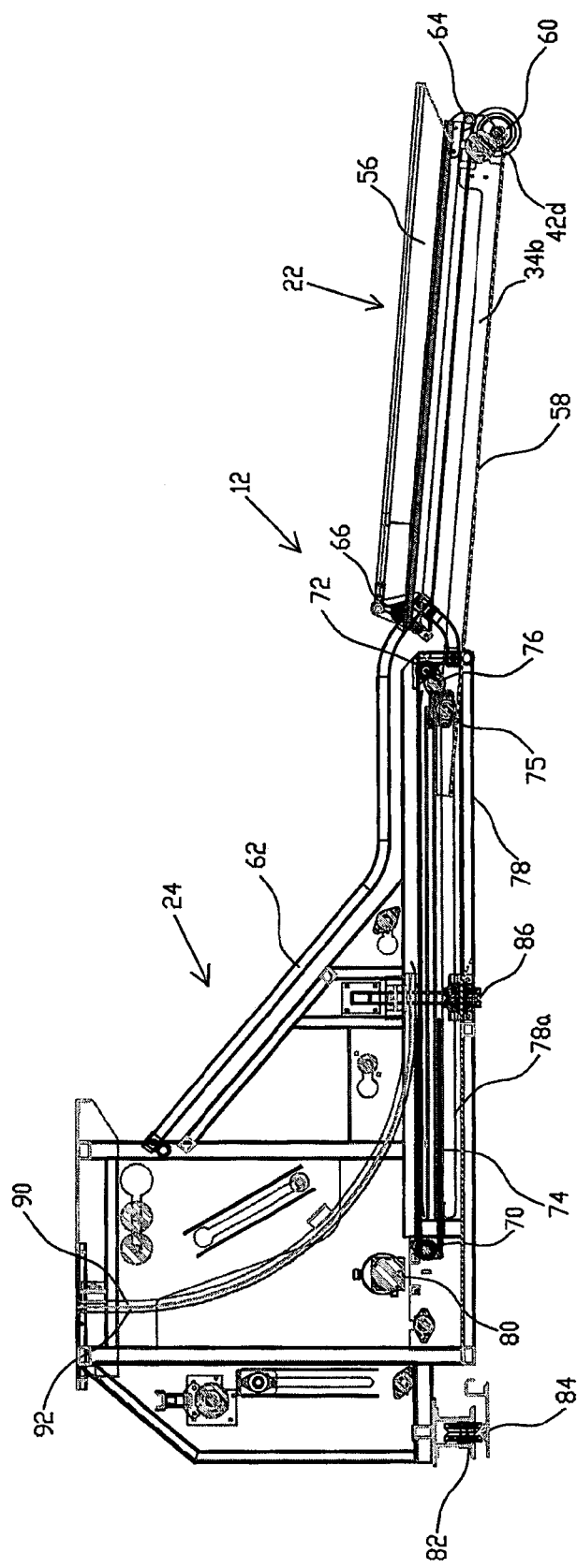
FIG. 2 is a lateral sectional view of a lower portion of the vertical lift conveyor of the present invention illustrating its conveyor intake and drive/transition stages showing an intake extension in the extended, or use, position.

Referring to FIG. 2, there is shown a lateral sectional view illustrating additional details of the conveyor's intake stage 12 and its intake extension 22 attached thereto. Intake extension 22 includes an upper trough-like guide member 56 adapted for directing bulk material deposited therein into a lower reservoir 58 of the intake extension 22. Disposed on the distal end of the intake extension 22 are a pair of wheels, where one of the wheels is shown as element 60 in FIG. 2. Also disposed on the distal end of the intake extension 22 is roller 42d which engages the return stage 34b of the second belt 34.

Wheels 60 allow the intake extension 22 to be extended from and retracted into the intake stage 12 in the following manner. Attached to an end portion of the conveyor's intake stage 12 is a fixed distal sprocket 72 coupled to a drive chain 74. Coupled to an opposing portion of drive chain 74, which is of the endless type, is a proximal drive sprocket 70 and a hydraulic motor (not shown), or other means which is powered by a hydraulic pump 80 in this case. An idler roller 75, coupled to a distal end of lower reservoir 58, is also coupled to lower portion of drive chain 74 and is also coupled to track 78a as shown in FIG. 3.

Rotation of proximal drive sprocket 70 by means of hydraulic drive motor coupled to it causes translation of chain 74 and a corresponding rotation of distal sprocket 72 resulting in either inward or outward displacement of the lower reservoir 58 of the intake extension 22 along track 78a relative to the conveyor intake stage 12. Rotation of the combination of proximal drive sprocket 70 and distal sprocket 72 in a first direction causes retraction of the intake stage lower reservoir 58 into the intake stage 12 as shown in FIG. 3, while rotation of the combination of the proximal and distal sprockets in the second, opposed direction causes extension of the lower reservoir 58 from intake stage 12 in a rightward direction as shown in FIG. 2. Idler roller 75 coupled to chain 74 is also employed to take up slack in belt 34*b*, utilizing fixed idler roller 76, as intake extension 22 is retracted/extended.

A distal portion of the intake extension's upper guide member 56 is pivotally attached to lower reservoir 58 by means of a pivot coupling 64. Retraction of the lower reservoir 58 into the conveyor intake stage 12 causes a corresponding leftward displacement of upper guide member 56 as shown in FIG. 3. Disposed on the upper surface of the conveyor intake stage 12 is a guide/support member 62. Disposed on the proximal end portion of the intake extension's upper guide member 56 is a coupler 66 which engages the guide/support member 62 disposed on an upper surface of the conveyor intake stage 12. Retraction of the intake extension's lower reservoir 58 into the conveyor intake stage 12 causes the displacement of the intake extension's upper guide member 56 to a position above and in alignment with the conveyor intake stage as shown in FIG. 3, where the intake extension 22 and lower reservoir 58 are shown in the fully retracted position.

Chain slack roller 88 is adapted for engaging chain 74 and taking up the slack in the chain when the lower reservoir 58 is retracted into the conveyor intake stage 12. Also shown in FIGS. 2 and 3 are first and second transport wheels 82 and 86 respectively attached to lower portions of the drive/transition stage housing 24 and the conveyor intake stage 12. First transport wheel 82 is shown engaging a support track 84. A similar support track may be provided for engaging and supporting the second transport wheel 86, but is omitted from the drawings for simplicity. The first and second transport wheels 82, 86 facilitate movement of the vertical lift conveyor 10 in a direction generally transverse to the plane of FIGS. 2 and 3 to permit the vertical lift conveyor to be moved to various positions for receiving, vertically transporting and discharging bulk material. Fixed tracks such as support track 84 facilitate movement and accurate positioning of the vertical lift conveyor 10 at various operating locations. These features may be provided by various other types of guide arrangements such as a slot formed in the support surface, i.e., the floor or other support surface, to receive and guide a transport wheel.

Also shown in FIGS. 2 and 3 are first and second curvilinear belt guides 90 and 92 disposed within the drive/transition stage housing 24. The first and second curvilinear belt guides 90, 92 in this embodiment of the invention replace the segmented belt edge guides 48 of the embodiment of the invention shown in FIG. 1 and described above. First and second curvilinear belt guides 90, 92 respectively engage the upwardly directed, transport stage 32*a* of the first flat, flexible belt 32 and the upward directed, transport stage 34*a* of the second flat, flexible belt 34. The first and second curvilinear belt guides 90, 92 are in mutual alignment and are each in the form of elongated curvilinear plastic or metal members each engaging respective adjacent edge portions of the upwardly directed, first belt transport stage 32*a* and upwardly directed, second belt transport stage 34*a*. It is in this manner that adjacent edge portions of the first and second flat, flexible belts 32, 34 are maintained in intimate contact with one another in traversing the curvilinear path through the conveyor's drive/transition stage 14 and its housing 24 in this embodiment of the invention.

Figure 4:
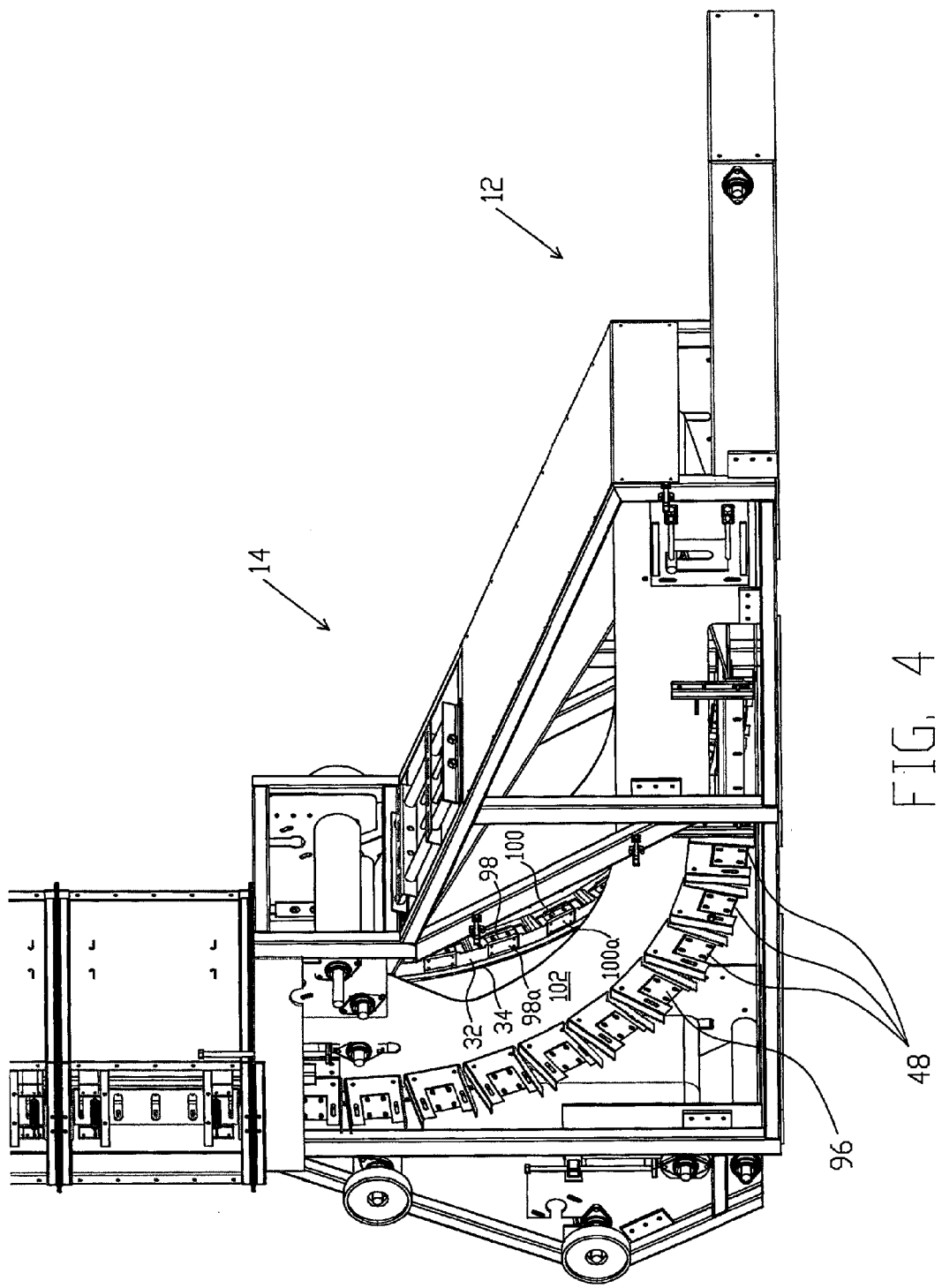
FIG. 4 is a partially cut away perspective view of a lower portion of the inventive vertical lift conveyor showing additional details of its drive/transition stage.

Referring the FIG. 4, there is shown additional details of a segmented belt guide arrangement for maintaining adjacent edges of the first and second upwardly directed, transport stages 32*a*, 34*a* of the first and second generally flat, flexible belts 32, 34 in intimate contact when traversing the curvilinear path through the conveyor drive/transition stage 14. In the embodiment of FIG. 4, there are shown plural spaced segmented belt edge guides 48, as also shown in FIG. 1. Each of the segmented belt edge guides 48 includes a respective outer flat plate 96. The segmented belt edge guides 48 shown in FIG. 4 are disposed adjacent to and engage the left hand edges of the first and second flat, flexible belts 32, 34 as viewed in the direction of travel of the transport stages of these two belts. A similar array of segmented belt edge guides are disposed adjacent to and engage right edge portions of the first and second flat, flexible belts 32, 34 where two of these right edge segmented belt guides are shown as elements 98 and 100 in FIG. 4, where the belts are shown partially cutaway. As described above, each of the segmented belt edge guides includes a respective outer flat plate, which are not shown for the segmented belt edge guides 98, 100 shown in FIG. 4 for simplicity. Attached to each of the flat plates of each of the segmented belt edge guides is a respective pair of upper and lower inner support plates. Thus, the inner support plates 98*a* and 100*a* of segmented belt edge guides 98, 100 engage an upper edge portion of the upwardly directed, transport stage 32*a* of the first flat, flexible belt 32. Similarly, a pair of inner lower support plates engage an edge portion of the upwardly directed, transport stage 34*a* of the second flat, flexible belt 34 for maintaining the edge portion in intimate contact with the adjacent edge portion of the upwardly directed, transport stage 32*a* of the first flat, flexible belt 32, although the lower support plates are not shown in FIG. 4 for simplicity.

Figure 5:
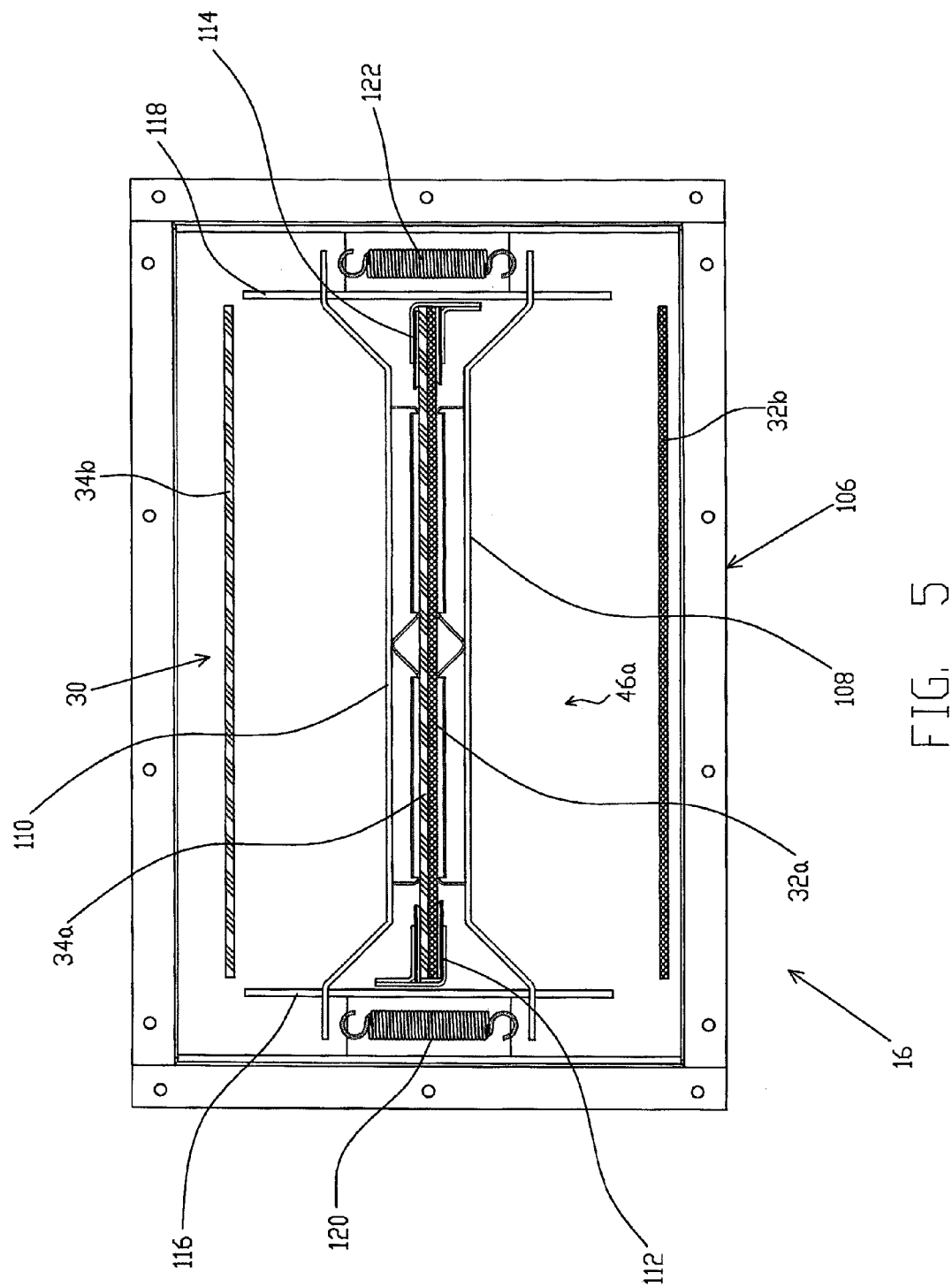
FIG. 5 is a horizontal sectional view of the vertical trunk stage of the inventive vertical lift conveyor illustrating details of one embodiment of a belt engaging arrangement for use in the present invention.

As described above, plural spaced belt engaging arrangements 46*a*-46*f* are disposed in the conveyor vertical trunk stage 16 for engaging adjacent edges of the upwardly directed, transport stages 32*a*, 34*a* of the first and second flat, flexible belts 32, 34 for maintaining the bulk material securely in position between the two moving belts in a sealed manner. Referring to FIG. 5, there is shown a horizontal sectional view of one of these belt engaging arrangements 30 disposed in the conveyor trunk stage 16 taken along site line 5-5 in FIG. 1. The first and second upwardly directed, transport stages 32*a*, 34*a* of the first and second flat, flexible belts 32, 34 are shown in intimate contact in the cross-sectional view of belt engaging arrangement 30 of FIG. 5. The first and second return stages 32*b* and 34*b* of the first and second flat, flexible belts 32, 34 are shown respectively in lower and upper portions of the conveyor trunk stage 16 and in spaced relation from the upwardly directed, transport stages 32*a* and 34*a*. In the view of FIG. 5, the first and second upwardly directed, transport belt stages 32*a* and 34*a* are displaced in a direction out of the plane of FIG. 5, while the first and second return stages 32*b* and 34*b* are travelling into the plane of the figure. Belt engaging arrangement 30 includes first and second low friction belt engaging guides 112 and 114 engaging opposed edges of the upwardly directed, transport belt stages 32*a* and 34*a*. It should be noted here that during operation, bulk material is disposed between and is transported by the first and second flat, flexible belts 32, 34 in the conveyor trunk stage 16, although for simplicity the transported material is not shown in FIG. 5.

The first and second low friction belt edge guides 112, 114 extend along the length of the abutting first and second flat, flexible belts 32, 34 and are attached to and maintained in fixed position respectively by first and second vertical support members 116 and 118 within the belt engaging arrangement 30. First and second vertical support members 116 and 118 are fixed structural members within the conveyor trunk stage 16. Respectively disposed adjacent to and outwardly from the first and second upwardly directed, transport belt stages 32*a* and 34*a* are first and second compression members 108 and 110. First and second compression members 108, 110 are attached to first and second vertical support members 116, 118, or to another fixed structural member, or members, within housing 106 of conveyor trunk stage 16. Coupled to adjacent first end portions of the first and second compression members 108, 110 is a first coiled spring 120, while a second coiled spring 122 is connected to opposed end portions of the first and second compression members. The first and second coiled springs 120, 122 urge the first and second compression members 108, 110 toward one another. Displacement means other than the first and second coiled springs 120, 122 could be used to urge the first and second compression members 108, 110 toward one another. Each of the first and second compression members 108, 110 includes an inner, generally flat portion which is configured and positioned so as to engage a respective outer surface of the first upwardly directed, transport belt stage 32a and the second upwardly directed, transport belt stage 134a, with bulk material disposed between and confined by the two flexible belts. The first and second compression members 108 and 110 provide support for the bulk material disposed between the first and second flat, flexible belts 32, 34 in the vertically extending conveyor trunk stage 16, and by so engaging the two flexible belts maintain the abutting edge portions of the two flexible belts in engagement with and sealed by the first and second low friction belt edge guides 112, 114.

Figure 6:
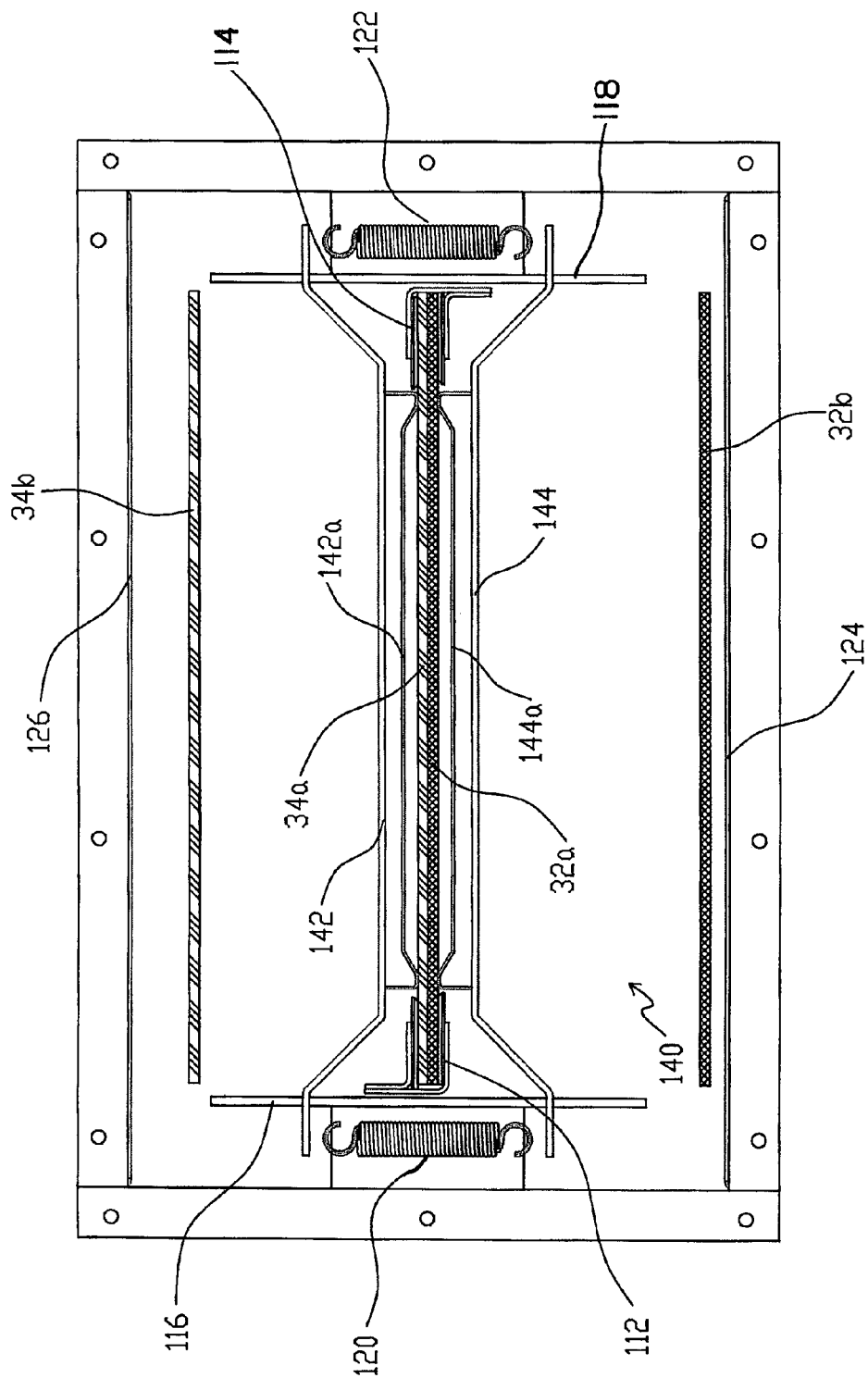
FIG. 6 is a horizontal sectional view of another embodiment of a belt engaging arrangement for use in the vertical lift conveyor of the present invention.

Referring to FIG. 6, there is shown another embodiment of a belt engaging arrangement 140 in accordance with the present invention. As in the previously described embodiment, the first and second upwardly directed, transport belt stages 32a and 34a are maintained in contact along their respective abutting edges by means of first and second low friction belt edge guides 112 and 114, which are attached to and supported by first and second vertical support members 116 and 118. As in the previously described embodiment, first and second flexible belt return stages 32b and 34b are disposed outwardly from the corresponding first and second upwardly directed, transport belt stages 32a and 34a and are positioned adjacent first and second lateral panels 124 and 126, respectively, of the conveyor trunk stage. First and second coiled springs 120 and 122 engage adjacent ends of compression members 142, 144 so as to urge the two compression members toward one another. Each of the compression members 142, 144 includes a respective inner belt engaging portion 142a and 144a, which is adapted to engage the outer surfaces of the first and second upwardly directed, transport belt stages 32a and 34a, with bulk material disposed between and confined by the two belts. Each of the inner belt engaging portions 142a and 144a of the compression members 142, 144 is tapered so as to prevent the bulk material disposed between the first and second upwardly directed, transport belt stages 32 and 34 from approaching the abutting edges of the two transport belts and to provide increased bulk material transport capacity. This arrangement better maintains sealed engagement between the two abutting edges of the first and second upwardly directed, transport belt stages 32a, 34a and prevents the bulk material from escaping from between the two belts.

Figure 7:
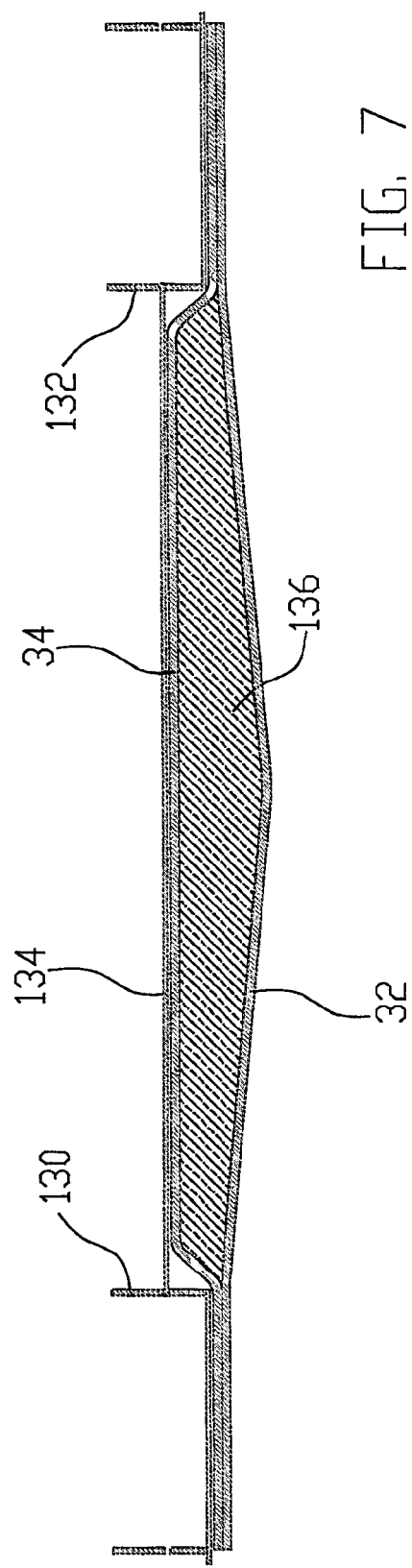
FIG. 7 is a sectional view of the combination of a support belt and a carrier belt transporting the material in bulk, or particulate, form in accordance with the present invention.

Referring to FIG. 7, there is shown a sectional view of the first carrier belt 32 arranged in sealed contact with the second support belt 34 taken along site line 7-7 through the conveyor drive/transition stage 14 as shown in FIG. 1. In FIG. 7, the combination of the first carrier belt 32 and the second support belt 34 is undergoing a transition from horizontal motion to vertical motion. In this transition area, first and second edge engaging members 130 and 132 respectively engage the left and right edges of the second support belt 34 which is on the inner portion of the curve, or is disposed above the first carrier belt 32 during the 90° turn. Each of the first and second edge engaging members 130, 132 and the bottom pan 134 extend 90° through the entire horizontal through vertical change of direction of motion. With the first and second edge engaging members 130, 132 on the inner portion of the 90° turn and with longitudinal tension applied to the first carrier belt 32 and the second support belt 34, the opposing edges of the first carrier belt are positioned in intimate contact with adjacent edges of the second support belt. FIG. 7 also illustrates the particulate material 136 disposed between the first carrier belt 32 and the second support belt 34 and confined between these two belts by means of the pressure applied to the opposed edges of each of these belts by the first and second edge engaging members 130 and 132. In the conveyor trunk stage during vertical motion, the belt engaging arrangements described above also prevent leakage of the bulk material by engaging the two belts and providing support for the bulk material confined between the two belts. First and second edge engaging members 130, 132 and bottom pan 134 are preferably comprised of a single, unitary structure.

Figure 8:
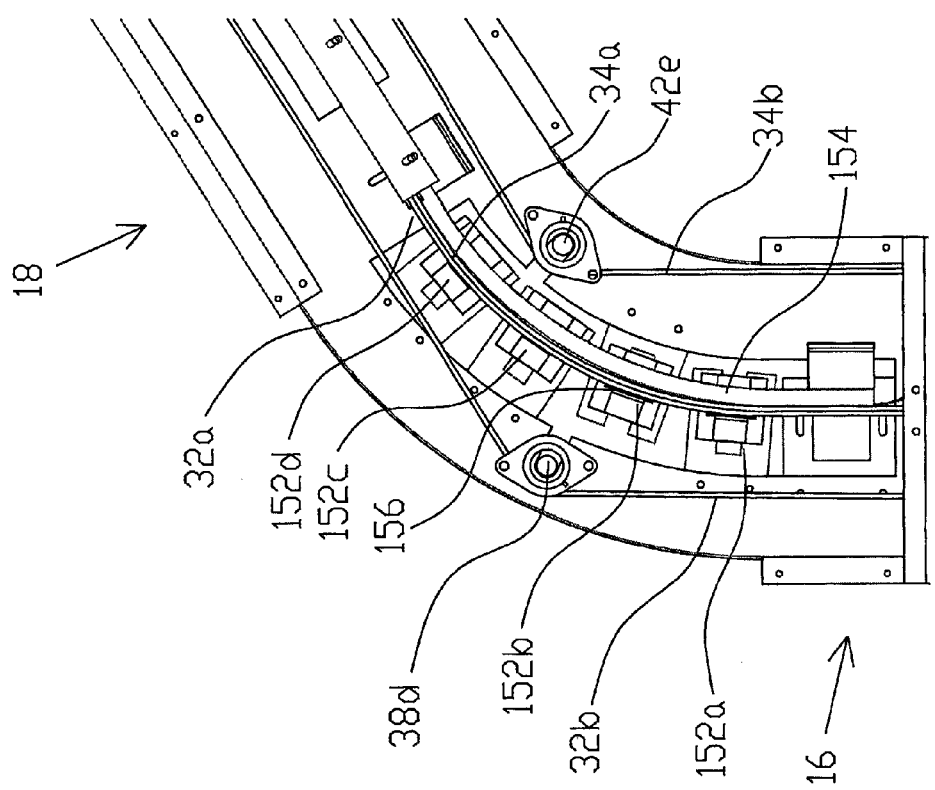
FIG. 8 is a sectional view of a portion of the inclined, upper stage of the vertical lift conveyor of the present invention.

Referring to FIG. 8, there is shown a sectional view of the transition between the conveyor trunk stage 16 and the conveyor inclined, upper stage 18. Disposed within this portion of the vertical lift conveyor 10 is roller 38d providing guidance and support for the return stage 32b of the first flat, flexible belt 32. Also disposed within this portion of the vertical lift conveyor 10 is another roller 42e which provides support and guidance for the return stage 34b of the second flat, flexible belt 34. Also included here is a curved support member 154 which provides support for the first and second upwardly directed, transport belt stages 32a and 34a as the belts transition from vertical transport to inclined transport. Disposed in a spaced manner along the path traveled by the first and second upwardly directed, transport belt stages 32a, 34a are first through fourth upper belt guides 152a-152d. Each of the four upper belt guides 152a-152d, as shown for the case of the second upper belt guide 152b, includes a respective belt engaging member 156b. Each belt engaging member 156 engages the upper surface of the first upwardly directed, transport belt stage 32a for maintaining the second upwardly directed, transport belt stage 34a in contact with the curved support 154 for ensuring sealed engagement between the two belts.

Figure 9:
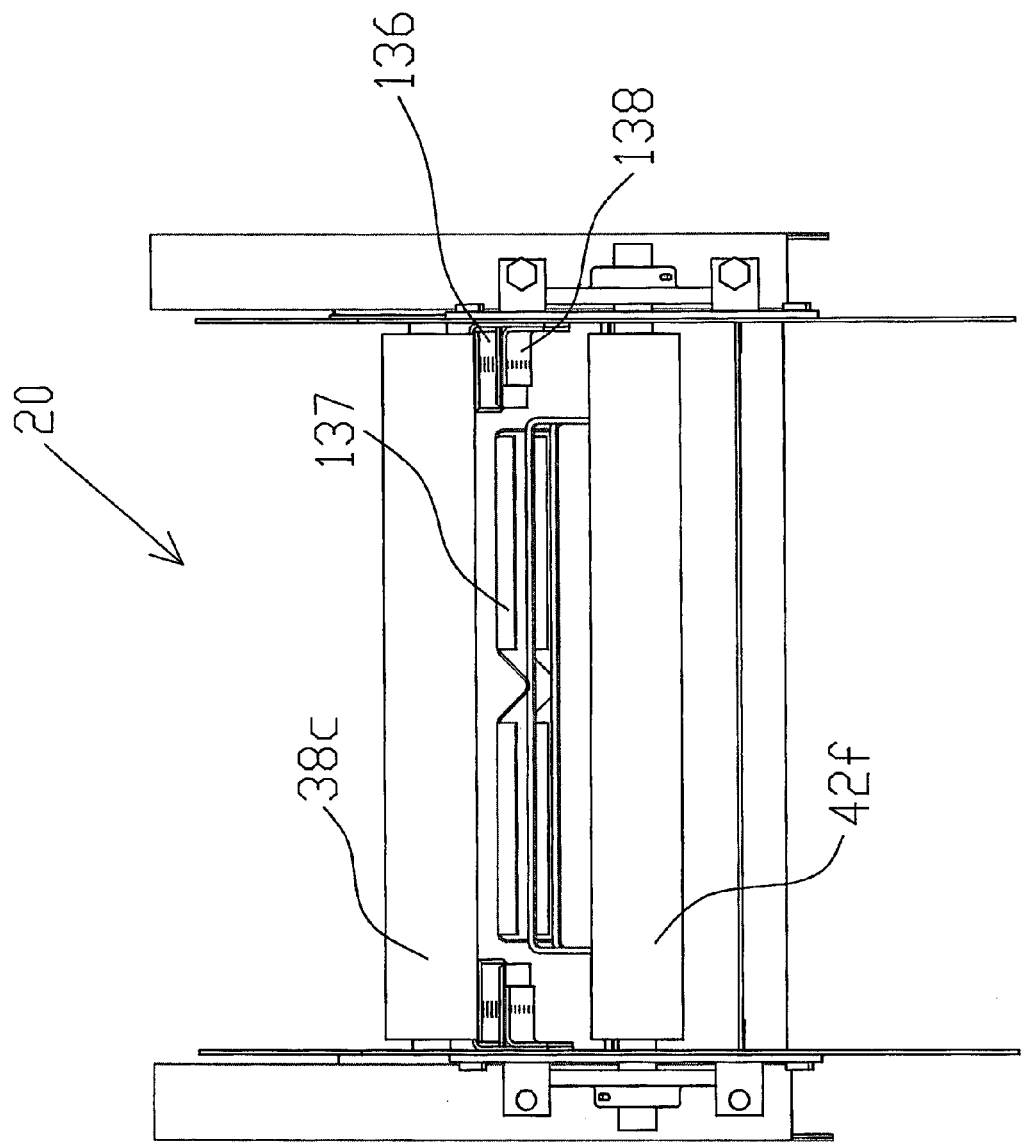
FIG. 9 is a sectional view of the discharge end of the inclined, upper stage of the vertical lift conveyor of the present invention.

Referring to FIG. 9, there is shown a transverse sectional view of the conveyor discharge stage 20. As described above, discharge stage 20 includes rollers 38c and 42f for respectively guiding and supporting the first and second flat, flexible belts 32 and 34 as they each transition from their outwardly directed, transport stages to their return stages. Also disposed within the conveyor discharge stage 20 are first and second belt guides 136 and 138 for engaging adjacent edges of the first and second flat, flexible belts 32, 34 and maintaining these edges in intimate contact. Finally, conveyor discharge stage 20 includes a belt support member 137 for supporting the first and second flat, flexible belts 32, 34 prior to discharge of the bulk material from the two belts and through the discharge hood 26.

While particular embodiments of the present invention have been shown and described, it will be apparent to those skilled in the art that changes and modifications may be made without departing from the invention and its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for use in a vertical transport portion of a vertical lift conveyor, wherein bulk material disposed between and engaged by first and second flexible, endless belts is transported from a lower elevation to a higher elevation, said apparatus comprising:
   first and second spaced belt edge guide plates—that extend along the length of said first and second belts and are maintained in fixed position—engaging and maintaining adjacent opposed edges of the first and second belts in sealed contact for confining the bulk material between the first and second belts during vertical transport of the bulk material;
   first and second support members respectively engaging and inwardly biased into contact with a respective outer surface of the first and second belts during vertical transport of the bulk material thereby providing lateral support for the bulk material disposed between and engaged by the belts during vertical transport.

2. The apparatus of claim 1, wherein each of said support members includes a generally flat surface aligned generally parallel with an adjacent belt for engaging the belt substantially over the belt's entire width.

3. The apparatus of claim 1, wherein in each of said support members includes a recessed portion aligned generally parallel with an adjacent belt for engaging an inner portion of the belt inwardly spaced from its opposed edges to confine the bulk material to inner adjacent portions spaced from the opposed edges of the first and second belts and provide higher bulk material capacity.

4. The apparatus of claim 1, wherein said first and second support members are inwardly biased by a resilient material.

5. The apparatus of claim 4, wherein said resilient material is metal or rubber.

6. The apparatus of claim 4, wherein said first and second support members are inwardly biased by coiled springs.

7. A vertical lift conveyor for lifting a bulk material from a lower elevation to a higher elevation, wherein the bulk material is disposed between and engaged by first and second flexible, endless belts in a sealed manner, said vertical lift conveyor comprising:
   an intake stage for receiving and transporting the bulk material in a generally horizontal direction;
   a transition stage coupled to said intake stage for receiving and redirecting the bulk material from the generally horizontal direction to a generally vertical direction;
   a trunk stage coupled to said transition stage for receiving and lifting the bulk material to a higher elevation;
   an extension section connected to said intake stage and to one of the flexible, endless belts and adapted to receive and provide the bulk material to said intake stage, wherein said extension section is movable between an extended use position for receiving the bulk material and a retracted non-use position for storage on or in said intake stage; and
   a lower reservoir in said extension section for receiving the bulk material and an upper guide member for directing bulk material into said lower reservoir, wherein said lower reservoir is stored in said intake stage and said upper guide member is disposed above said intake stage when in the retracted non-use position.

8. The vertical lift conveyor of claim 7 further comprising a drive arrangement coupling said extension section to said intake section for moving said extension section between the extended use position and the retracted non-use position.

9. The vertical lift conveyor of claim 8, wherein said drive arrangement displaces said extension section telescopically into and out of said intake stage.

10. The vertical lift conveyor of claim 8, wherein said drive arrangement includes plural sprockets and at least one drive chain coupled to said sprockets, and wherein at least one of said sprockets is attached to said extension section.

11. The vertical lift conveyor of claim 10, wherein said drive arrangement further includes a drive motor coupled to one of said sprockets.

12. The vertical lift conveyor of claim 11, wherein said drive motor is hydraulically operated.

13. The vertical lift conveyor of claim 7 further comprising at least one wheel coupled to said extension section to facilitate movement of said extension section between the extended use position and the retracted non-use position.

14. The vertical lift conveyor of claim 7 further comprising a support member disposed on an upper portion of said intake stage and coupled to said upper guide member for guiding said upper guide member between the retracted non-use and extended use positions and supporting said upper guide member in the retracted non-use position.

15. The vertical lift conveyor of claim 14, wherein said support member is in the form of an elongated, angled tube.

16. The vertical lift conveyor of claim 7 further comprising at least one wheel coupled to a lower portion of said transition stage to facilitate movement of said vertical lift conveyor.

17. The vertical lift conveyor of claim 16, wherein said at least one wheel is adapted for engaging, and movement on, a guide system.

18. The vertical lift of conveyor of claim 17, wherein said guide system includes one or more tracks.

19. A vertical lift conveyor comprising:
   first and second adjacent moving resilient endless belts each having a pair of opposed edges;
   edge engaging plates—that extend along the length of said first and second belts and are maintained in fixed position—for maintaining adjacent edges of said first and second resilient endless belts in sealed contact;
   an intake stage adapted for receiving on said first belt bulk material, wherein said bulk material is conveyed and is confined between said first and second belts in a sealed manner by said edge engaging plates;
   a drive/transition stage coupled to said intake stage for displacing said sealed belts and redirecting said belts and the bulk material disposed therebetween from horizontal motion to vertical motion;
   a trunk stage coupled to said drive/transition stage for lifting the bulk material to a higher elevation wherein said bulk material is conveyed and is confined between said first and second belts in a sealed manner by said edge engaging plates; and
   plural support members disposed in said trunk stage and urging said first and second belts toward one another and providing lateral support for the bulk material during its vertical transit.

* * * * *